UNITED STATES PATENT OFFICE.

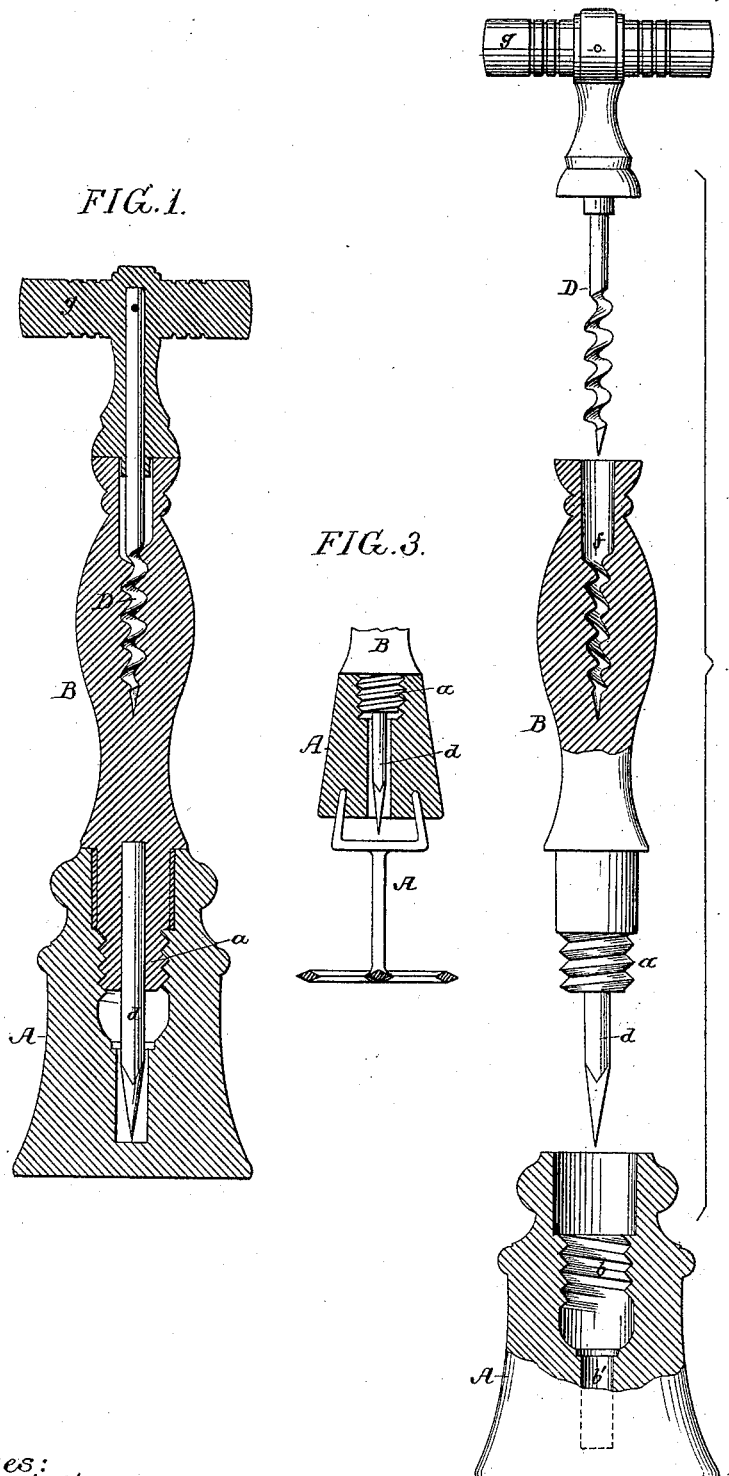

JOHN CUNDEY, SR., OF BRISTOL, PENNSYLVANIA.

KITCHEN UTENSIL.

SPECIFICATION forming part of Letters Patent No. 392,107, dated October 30, 1888.

Application filed January 17, 1888. Serial No. 261,055. (No model.)

*To all whom it may concern:*

Be it known that I, JOHN CUNDEY, Sr., a citizen of the United States, and a resident of Bristol township, Bucks county, Pennsylvania, have invented certain Improvements in Kitchen Utensils, of which the following is a specification.

The object of my invention is to construct a kitchen utensil combining a number of useful tools, the parts being so combined that the tools are protected when not in use.

In the accompanying drawings, Figure 1 is a longitudinal sectional view of a kitchen utensil constructed in accordance with my invention. Fig. 2 is a side view of the parts detached from each other, and Fig. 3 a view illustrating a modification of part of the invention.

Externally the implement, when the parts are properly applied to each other, has the appearance of an ordinary potato-masher, A being the head of the implement, and B the stem or shank of the same. This stem, however, is separate from the head, and has a threaded projection, $a$, which screws into a threaded recess, $b$, in the head A, the end of the stem being provided with a projecting metallic blade or finger, $d$, which can be used as an ice-pick or for other analogous purposes, a recess, $b'$, in the head A of the implement receiving this projecting blade when the stem is applied to the head. The opposite end of the stem B has a threaded recess, $f$, which receives the stem of a corkscrew, D, the latter being provided with the usual transverse handle, $g$.

When the parts are all together, as shown in Fig. 1, the implement can be used as a potato-masher, the corkscrew being removed from the stem B when required, or the stem itself being unscrewed from the head A when it is desired to use the pick $d$. When the parts are together, the corkscrew and pick are hidden and protected. The portion A of the implement may, however, be made in the form of a skeleton frame of wire, as shown in Fig. 3, if desired.

I claim as my invention—

1. The combination of the stem or handle B, having a projecting pick at one end and a threaded recess at the opposite end, with a corkscrew adapted to said threaded recess, and having a stem or handle independent of the stem B, all substantially as specified.

2. The combination of the stem of the implement recessed at one end and having a projecting pick at the opposite end, with the head recessed for the reception of the pick, and a corkscrew adapted to the recessed end of the stem, all substantially as specified.

In testimony whereof I have signed my name to this specification in the presence of two subscribing witnesses.

JOHN $\overset{\text{his}}{\times}$ CUNDEY, SR.
mark.

Witnesses:
WILLIAM D. CONNER,
HARRY SMITH.